H. A. HUMMER.
Plow.
No. 57,724.
Patented Sept. 4, 1866.
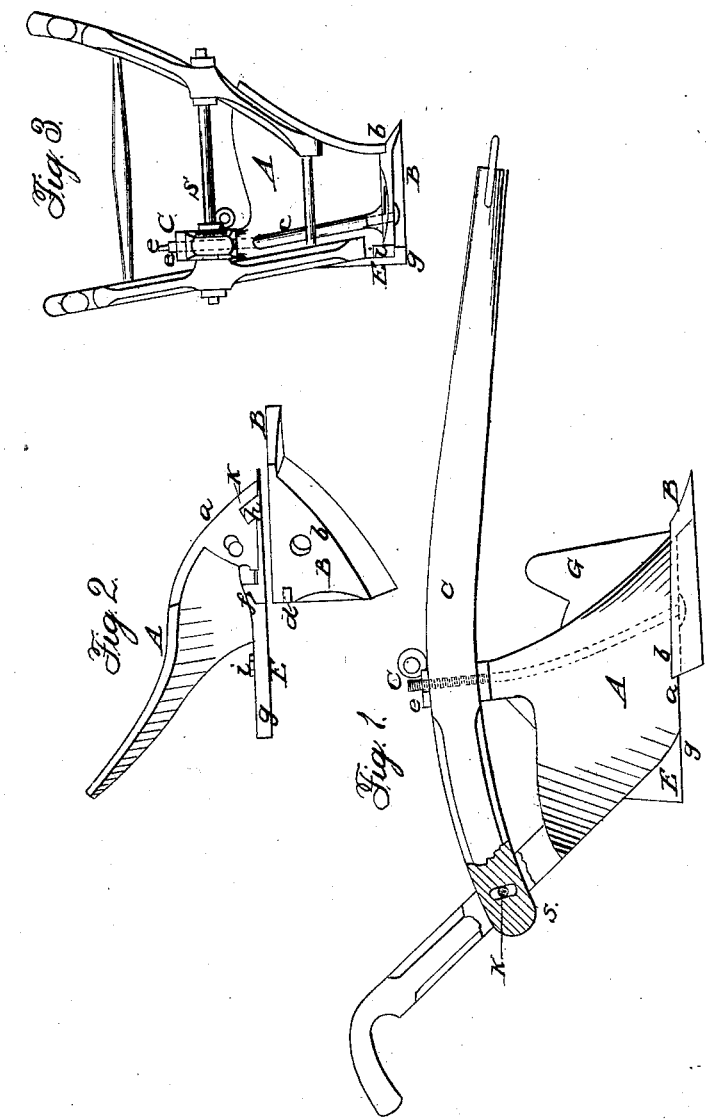
Witnesses:
Sam¹ J. Selly
D. Silton
Inventor:
Herbert A. Hummer
by his Atty
Baldwin & Son

UNITED STATES PATENT OFFICE.

HERBERT A. HUMMER, OF FRANKLIN TOWNSHIP, HUNTERDON COUNTY, NEW JERSEY.

IMPROVEMENT IN PLOWS.

Specification forming part of Letters Patent No. 57,724, dated September 4, 1866.

*To all whom it may concern:*

Be it known that I, HERBERT A. HUMMER, of Franklin township, Hunterdon county, and State of New Jersey, have invented a new and useful Improvement in Plows; and I do hereby declare that the following is a full, clear, and exact description of the same, reference being had to the annexed drawings, making a part of this specification, and in which—

Figure 1 is a side elevation of my plow, showing my invention in part. Fig. 2 is a bottom view, showing the second part of my invention; and Fig. 3 is a rear elevation of the plow.

My invention has relation to that class of plows in which the mold-board and land-side are connected by a joint to permit the removal of either to replace a worn or broken land-side or mold-board, and in which it is desired to have an adjustment for plowing at various depths; and my invention consists in so forming the union between the land-side and mold-board as to avoid a joint in any part of the wearing-surface of either, so that when one or the other becomes worn or broken it can be replaced without having any ridge or projection at the joint.

To enable others skilled in the art to make and use my invention, I will proceed to describe the construction and operation of my improved plow.

My mold-board A may be made in any of the most approved forms, having a supporting-stock to connect with the beam, and loops or bolt-holes to support one of the handles.

The share B is formed with a projecting flange, *b*, to correspond with the curve *a* of the lower edge of the mold-board, and the shear and mold-board are firmly held together by the coupling-bolt *c*, which passes through both and through the beam C, where it is firmly secured by the nut *e*. The share B connects with the land-side E by a notch, *d*, which fits on the stud or projection *f* on the land-side E, and the land-side also carries a shoe, *g*, which terminates at the rear of the land-side, and is secured there by a bolt, *i*.

The land-side E has a dovetail projection *h h* on its inner side, which is so formed as to fit snugly in a dovetail groove or mortise, *k k*, on the inner side of the mold-board, and the land-side and mold-board are snugly held together by a wedge or key, which may be bent at the top to retain it securely in place when the land-side and mold-board are firmly united.

A cutter, G, may be attached to the land-side by a bolt, and may be made reversible, so that when one edge is worn the other may be used. The land-side may also carry loops to receive one of the handles near its rear end, or the handle may be secured thereto by bolts in the usual manner.

It will thus be obvious that by the mode in which the land-side and mold-board are united, no joint is exposed to the usual surface-wear, and that consequently when either a mold-board or land-side is to be removed the old and new will always present the same uniform plane surface as when the land-side and mold-board are both new, and thus my plow will uniformly run smoothly and wear uniformly over the whole surface of both the mold-board and land-side.

To adjust the depth of furrow to the character of the soil or strength of the team, I have constructed a transverse slot, H, in the rear of the beam C. Through this slot passes a screw-bolt, *s*, which is supported by the handles of the plow at the desired elevation to give the proper set to the beam for plowing the mere usual depth. Now, when it is desired to vary the depth of plowing the nuts on the screw-bolt *s* are loosened, and that on the coupling-bolt *c* relieved by a single turn, when the beam can be elevated or depressed to the extent of the slot H, and the nuts screwed tight, and thus govern the depth of plowing without altering the clevis, as is usually necessary.

To give more or less land a side adjustment of the heel of the beam may be effected by merely changing the position of the washers at each side of the beam, and having them threaded to work on the screw-bolt *s*.

What I claim as my invention, and desire to secure by Letters Patent, is—

Uniting the mold-board and land-side of the plow by a concealed joint, constructed and arranged substantially as and for the purpose described.

In testimony whereof I have hereunto subscribed my name.

HERBERT A. HUMMER.

Witnesses:
 DANIEL LITTLE,
 EDM. F. BROWN.